United States Patent
Stipanovic

[15] 3,659,685
[45] May 2, 1972

[54] SLACK ADJUSTER FOR DISC BRAKE

[72] Inventor: Joseph G. Stipanovic, McKeesport, Pa.

[73] Assignee: Westinghouse Air Brake Company, Wilmerding, Pa.

[22] Filed: Oct. 28, 1970

[21] Appl. No.: 84,725

[52] U.S. Cl. .............................. 188/72.5, 188/59, 188/71.8, 188/196 A
[51] Int. Cl. ................................. F16d 55/228, F16d 65/74
[58] Field of Search ...................... 188/59, 71.8, 72.5, 196 A; 60/54.5 S, 54.6 S

[56] References Cited

UNITED STATES PATENTS

| | | | |
|---|---|---|---|
| 3,053,349 | 9/1962 | Huntress et al. | 188/196 A X |
| 3,243,026 | 3/1966 | Snoy et al. | 188/196 A X |
| 3,517,784 | 6/1970 | Clemmons | 188/196 A |

*Primary Examiner*—Duane A. Reger
*Attorney*—Ralph W. McIntire, Jr.

[57] ABSTRACT

A pneumatically controlled hydraulically actuated disc-type brake mechanism for use on a wheel and axle assembly of a railway vehicle truck includes a hydraulic-type slack adjuster mechanism automatically operative to compensate for wear of a braking element. The hydraulic-type slack adjuster mechanism comprises a variable volume accumulator into which a hydraulic medium or fluid is forced upon the occurrence of wear of a braking element while a brake application is in effect and from which hydraulic fluid subsequently flows to two pair of hydraulic brake applying cylinders upon initiating a brake release to increase the volume thereof thereby to compensate for brake element wear. Prior to completion of the brake release, hydraulic fluid flows from a storage reservoir to the accumulator to replace that previously supplied from the accumulator to the hydraulic brake applying cylinders.

12 Claims, 3 Drawing Figures

INVENTOR.
JOSEPH G. STIPANOVIC
BY Ralph W. McIntire, Jr.
ATTORNEY

INVENTOR.
JOSEPH G. STIPANOVIC
BY
Ralph W. McIntire, Jr.
ATTORNEY

SLACK ADJUSTER FOR DISC BRAKE

BACKGROUND OF INVENTION

Pneumatically actuated disc-type brakes have been in use on railway vehicle trucks for a number of years and where only limited braking forces are required have proven satisfactory. However, modern railway trains of ever increasing speed require correspondingly higher braking forces in order to maintain the same stopping distances. In order to provide the required braking force without unduly increasing the size of the brake mechanism, this demand can be best met by the use of a hydro-pneumatic type of disc brake in which stationary braking elements are forced into engagement with a rotating disc secured to a wheel and axle assembly. It is apparent that forcing the stationary braking elements against the rotating disc results in wear.

Accordingly, it is the general purpose of this invention to provide a simple and inexpensive hydro-pneumatic type of disc brake mechanism that embodies therein a novel hydraulic slack adjuster mechanism which is operable as these brake elements wear away to maintain a substantially constant clearance between these brake elements and the rotating disc.

SUMMARY OF INVENTION

According to the present invention, a rotating disc secured to a railway vehicle truck wheel and axle assembly is disposed between two stationary braking elements that are forced into and out of contact with the rotating disc to effect a brake application and a brake release. For forcing these stationary braking elements against the roating disc, the present invention provides two pair of parallel arranged, inter-connected and oppositely movable hydraulic fluid motors so disposed on opposite sides of the rotating disc that each pair, when actuated by hydraulic pressure supplied by two hydro-pneumatic fluid motors, is effective to force a corresponding stationary braking element into braking contact with an adjacent side of the rotating disc. These four interconnected fluid motors are provided with a single novel hydro-pneumatic automatically operative slack adjuster mechanism embodied in a casing including the four fluid motors and a hydraulic fluid reservoir.

This novel slack adjuster mechanism comprises an accumulator in the form of a cylinder having disposed therein a spring-biased piston and a hydro-pneumatic piston cylinder arrangement actuated upon the occurrence of brake element wear while a brake application is in effect to force hydraulic fluid to the accumulator thereby to increase its volume. Upon initiating a brake release, the spring-biased piston is rendered effective to force hydraulic fluid from the accumulator past a one-way valve to the cylinders of the four fluid motors the volumes of which are thereby increased as the brake release continues. Just prior to a complete release of the hydraulic pressure from the fluid motors, the pressure in their respective cylinders exceeds that in the cylinder of the slack adjuster mechanism whereupon the first one-way valve is closed and a second one-way valve subsequently opens to admit hydraulic fluid from the storage reservoir to the slack adjuster cylinder.

Figure 1:
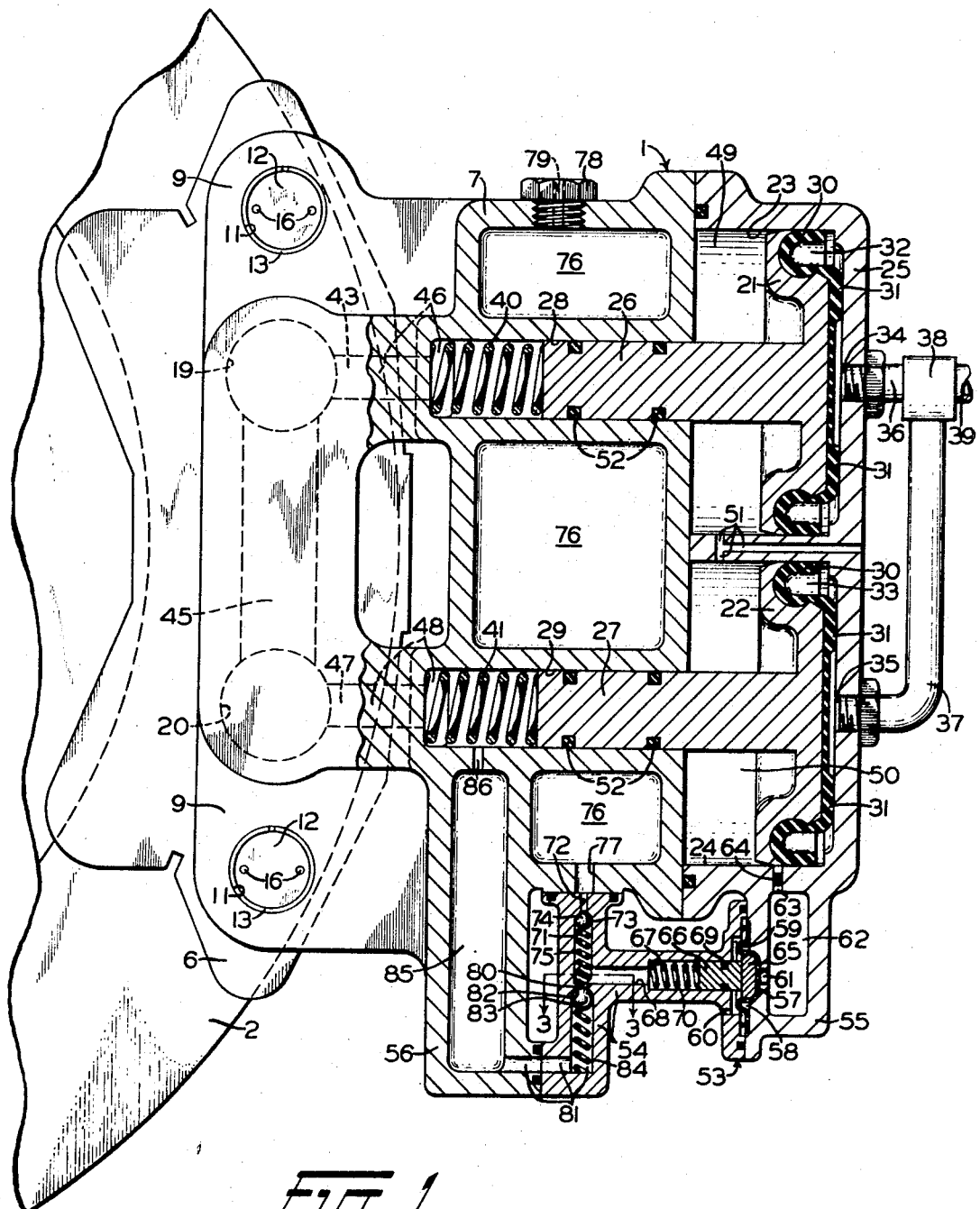
FIG. 1 is a side elevational view, partly in section, of a disc-type brake mechanism constructed in accordance with the present invention.
Figure 2:
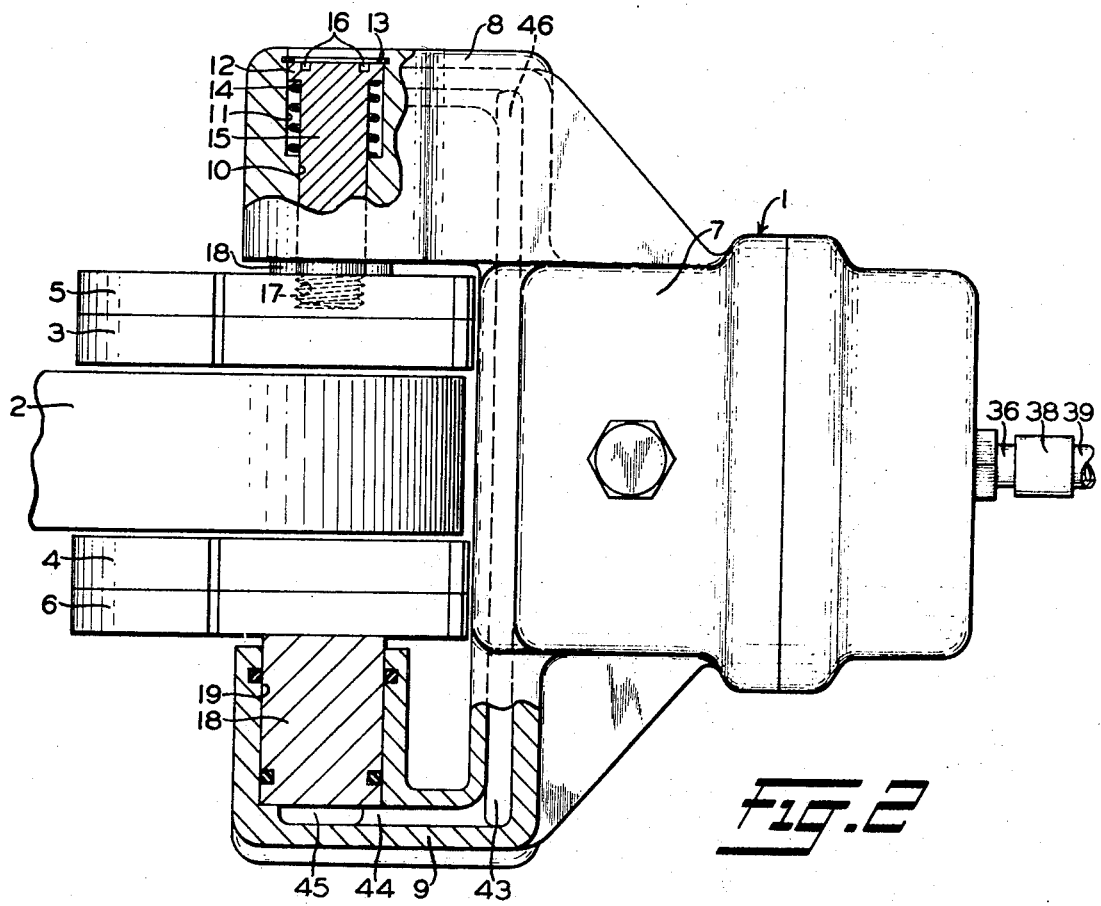
FIG. 2 is a plan view, partly in section, of a disc-type brake unit shown in FIG. 1.

As shown in FIGS. 1 and 2 of the drawings, a pneumatically controlled hydraulically actuated disc-type brake mechanism 1 is provided for applying a braking force to each side of a rotary brake disc 2 which is carried on a wheel and axle assembly (not shown) of a railway vehicle truck (not shown).

The opposite sides of the brake disc 2 provide braking faces in cooperative relation with which are disposed braking elements or shoes 3 and 4. These brake shoes are shown as of segmental form and are constructed of a suitable composition friction material. Furthermore, these brake shoes 3 and 4 are respectively secured to corresponding backing plates 5 and 6 as by the use of a suitable cement.

Each brake shoe and its corresponding backing plate is normally maintained in a release position by a brake release means now to be described in detail.

The brake mechanism 1 comprises a casing 7 having formed integral therewith and extending from each side thereof, as best seen in FIG. 2, a pair of generally U-shaped arm members 8 and 9.

Each of the arm members 8 and 9 is provided with two parallel bores 10 spaced apart one directly above the other. The upper one of these bores 10 in the arm member 8 appears in FIG. 2 of the drawing, it being understood that the other bore is disposed directly beneath it and that the arm member 9 is provided with two bores 10 that are coaxial with the corresponding bores 10 in the arm member 8.

Coaxial with each of the spaced apart bores 10 in each of the arm members 8 and 9 is a counterbore 11 the upper one of these counterbores in the arm member 8 appearing in FIG. 2.

It should be understood that, as shown in FIG. 2, a release piston 12 is slidably mounted in each of the counterbores 11 and is normally biased against a snap ring 13 that is inserted in a groove formed in the wall surface of the counterbore 11 by a spring 14 interposed between a shoulder formed by the end of the counterbore 11 and the respective piston 12.

Each of the pistons 12 has a piston rod 15 formed integral therewith which rod 15 extends through the corresponding bore 10 and is provided with screw threads at its outer end. Furthermore, each piston 12 is provided with two diametrically arranged bottomed bores 16 for receiving a spanner wrench whereby the piston 12 and piston rod 15 can be rotated to cause advancement of the screw threaded end of the piston rod into a screw threaded bottomed bore 17 provided in the respective backing plate 5 or 6.

From the foregoing, it will be understood that each of the backing plates 5 and 6 together with the brake shoe cemented thereto is supported by two piston rods 15 extending from two corresponding pistons 12 disposed on the same side of the brake disc 2 and is biased to its release position shown in FIG. 1 by two springs 14, one of which for the backing plate 5 and the brake shoe 3 secured thereto appears in FIG. 1.

Each of the brake shoes 3 and 4 is moved into braking contact with the corresponding braking face of the braking disc 2 by one of two pair of hydraulic pistons 18 one piston of one pair appearing in FIG. 2 of the drawings. As shown in FIGS. 1 and 2, the two pistons 18 for moving brake shoe 4 into braking contact with the brake disc 2 are sealably and slidably mounted in two bottomed bores 19 and 20 (FIG. 1) provided in the casing 7, it being noted that these bores are disposed in parallel spaced apart relation between the hereinbefore-mentioned parallel spaced apart bores 10 and coaxial counterbores 11 also in this casing. Furthermore, it may be noted that the axes of the bores 10, 19, and 20 lie in a common vertical plane that is perpendicular to the brake disc 2.

Though not shown in the drawings, it will be understood that two pistons 18 for moving the brake shoe 3 into braking contact with the brake disc 2 are sealably and slidably mounted in two bottomed bores that are provided in the arm member 8 and are coaxial with the bottomed bores 19 and 20 in the arm member 9, it being noted that these bottomed bores extend from their open end in a direction opposite that of the bottomed bores 19 and 20.

Hydraulic fluid is supplied to the above-mentioned four hydraulic pistons 18 by a hydro-pneumatic brake application and release portion embodied in the hereinbefore-mentioned casing 7. This portion comprises two parallel spaced apart pneumatic pressure actuated power pistons 21 and 22 (FIG. 1) respectively slidably mounted in two parallel spaced apart bottomed bores 23 and 24 formed in a pressure head 25 that is secured to the right-hand end of the casing 7 by any suitable means (not shown), and two master hydraulic pistons 26 and 27 which are operatively connected to the respective pneumatic power pistons 21 and 22. A pair of parallel spaced apart bottomed bores 28 and 29 are provided in the casing 7 for receiving respectively the left-hand end of the master hydraulic pistons 26 and 27.

Formed on a packing cup 30 secured to each of the pistons 21 and 22 are a plurality of lugs 31 which, when the pistons 21 and 22 occupy the position shown in FIG. 1, contact the pressure head 25 to form respectively a pair of pressure chambers 32 and 33 to which pneumatic pressure may be supplied through a pair of ports 34 and 35 and a pair of pipes 36 and 37 which are connected respectively to one end and the side outlet of a pipe tee 38 to the other end of which is connected one end of a pipe 39. The other end (not shown) of the pipe 39 is connected as by means of a flexible hose (not shown) to the brake cylinder pipe of a control valve, such as an "AB" valve, of the usual air brake system on railway vehicles.

A pair of springs 40 and 41 interposed respectively between piston 26 and the end of the bottomed bore 28, and between the piston 27 and the end of the bottomed bore 29 serves to yieldingly bias the pistons 21 and 26, and 22 and 27 in a brake releasing direction to the position in which they are shown in FIG. 1 of the drawings.

As shown in FIG. 2 of the drawings, one end of a passageway 43 formed in arm member 9 opens into a chamber 44 at the lower side of the piston 18. This passageway 43 extends through the arm member 9 and the casing 7 and at its opposite end opens into the bottomed bore 28 at the left-hand end thereof. As shown in FIGS. 1 and 2, a vertical passageway 45 is provided in the arm member 9 that at its upper end opens into the chamber 44 at the outer end of the upper piston 18. The lower end of this passageway 45, as can be seen from FIG. 1, opens into a chamber at the outer end of the lower piston 18. Accordingly, it is apparent that the passageways 43 and 45 provide a conduit through which hydraulic fluid may flow from the left-hand end of the bottomed bore 28 to the chamber 44 (FIG. 2) and the corresponding chamber directly beneath it at the outer end of the lower piston 18 (not shown).

As shown in FIGS. 1 and 2, one end of a passageway 46 formed in arm member 8 and casing 7 opens into the bottomed bore 28 diametrically opposite the location at which the hereinbefore-mentioned opposite end of the passageway 43 opens into this bottomed bore 28. This passageway 46 provides a conduit through which hydraulic fluid may flow from the left-hand end of the bottomed bore 28 to chambers (not shown) corresponding to the chamber 44 at outer end of the two pistons 18 (not shown) carried in the arm member 8 and disposed above the backing plate 5, as viewed in FIG. 2, it being understood that a vertical passageway (not shown) corresponding to the passageway 45 is provided in the arm member 8 to connect the two chambers at the outer, or upper end as viewed in FIG. 2, of these two pistons 18.

Extending through the arm member 9 and the casing 7 and in parallel spaced apart relation to the passageway 43 therein is a passageway 47 a portion of which is indicated in FIG. 1 of the drawings. One end of this passageway 47 opens into the chamber at the lower end of passageway 45 and at the outer end of the lower piston 18 (not shown) which is carried in the arm member 9 below the blacking plate 6, as viewed in FIG. 2. The opposite end (not shown) of this passageway 47 opens into the left-hand end of the bottomed bore 29 (FIG. 1) diametrically opposite the location at which one end of a passageway 48 opens into this bottomed bore 29. This passageway 48 extends through the casing 7 and arm member 8 in parallel spaced apart relation to the hereinbefore-mentioned passageway 46 and at its opposite end opens into the lower end of a vertical passageway (not shown) corresponding to the passageway 45 and at the outer end of the lower piston 18 (not shown) which is carried in the arm member 8 it being understood that this piston is disposed above the backing plate 5, as viewed in FIG. 2.

The above-described passageways provide for simultaneous flow of hydraulic fluid from the left-hand end of the bottomed bores 28 and 29 to the chambers corresponding to the chamber 44 at the outer end of each of the four pistons 18 to move these pistons in the direction of the braking disc 2 when the master hydraulic pistons 26 and 27 are moved in the direction of the left-hand, as viewed in FIG. 1, in response to the simultaneous supply of pneumatic pressure to the chambers 32 and 33.

As shown in FIG. 1, the left-hand side of the pneumatic power piston 21 cooperates with the casing 7 and the wall of the bottomed bore 23 in the pressure head 25 to form a non-pressure chamber 49. Likewise, the left-hand side of the power piston 22 cooperates with the casing 7 and the wall of the bottomed bore 24 in the pressure head 25 to form a non-pressure chamber 50 which, like the chamber 49, is constantly open to atmosphere via a passageway 51 provided in the pressure head 25.

The master hydraulic pistons 26 and 27 are each provided intermediate their ends with two, axially spaced peripheral annular grooves in each of which is disposed an O-ring 52. These O-rings 52 have sealing and sliding contact with the wall surface of the respective bottom bores 28 and 29 to minimize leakage of fluid pressure from the interior of these bottomed bores to the corresponding non-pressure chambers 49 and 50 when the master hydraulic pistons 26 and 27 are moved in the direction of the left hand.

Figure 3:
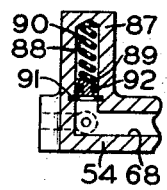
FIG. 3 is a cross-sectional view, taken along the line 3—3 of FIG. 1 and looking in the direction of the arrows, showing certain structural details not made apparent in FIG. 1.

A hydraulic-type slack adjuster mechanism 53, which is shown in FIGS. 1 and 3, comprises a casing 54 which is interposed between a leg member 55 that is formed integral with the pressure head 25 and a leg member 56 that is formed integral with the casing 7 and secured to these leg members by any suitable means (not shown).

The outer periphery of a diaphragm 57 is clamped between the right-hand end of the casing 54 and the left-hand end of the above-mentioned leg 55.

The diaphragm 57 cooperates with the leg member 55 and the casing 54 to form within the slack adjuster mechanism 53 and on the opposite sides of the diaphragm, two chambers 58 and 59, the latter being constantly open to atmosphere via a port 60 provided in the casing 54. The chamber 58 on the right-hand side of the diaphragm 57 is connected by a short passageway 61 to a chamber 62 formed in the leg member 55. Opening into the chamber 62 is one end of a passageway 63 formed in the pressure head 25 and having disposed therein a choke 64. The opposite end of passageway 63 opens at the wall surface of the bottomed bore 24 in the pressure head 25 at such a location that this end of passageway 63 is uncovered by the packing cup 30 carried by the pneumatic power piston 22 when the travel of this piston 22 exceeds a chosen amount it being understood that this excessive piston travel occurs only in response to a chosen amount of wear of the brake shoes 3 and 4 or of the brake disc 2, or a combination of the wear of both shoes and disc.

Disposed in the chamber 59 is an annular diaphragm follower 65 which is interposed between the left-hand side of the diaphragm 57 and the right-hand end of a hydraulic piston 66 that is slidably mounted in a counterbore 67 coaxial with a bottomed bore 68 provided in the casing 54. This hydraulic piston 66 is provided with a peripheral annular groove in which is disposed an O-ring 69 that forms a seal with the wall surface of the counterbore 67 to prevent leakage of hydraulic fluid from the interior thereof to the chamber 59 which is open to atmosphere.

A spring 70 is interposed between a shoulder formed by the left-hand end of the counterbore 67 and the hydraulic piston 66 to normally bias this piston, the diaphragm follower 65 and the diaphragm 57 to the position shown in FIG. 1.

As shown in FIG. 1, opening into the left-hand end of the bottomed bore 68 is one end of a counterbore 71 that is coaxial with a bore 72 provided in the casing 54, it being noted that the axis of this bore and counterbore forms a right angle with the axis of the bottomed bore 68 and that an annular valve seat 73 is formed at the junction of this bore and counterbore. A ball-type valve 74 is normally biased against the seat 73 by a spring 75 interposed between the valve 74 and the wall surface of the bottomed bore 68 to close communication between a hydraulic fluid reservoir 76 formed in the casing 7 and the interior of the counterbore 71 via a short passageway 77 provided in the casing 7 and the bore 72 which is coaxial therewith. The reservoir 76 may be filled with some suitable hydraulic medium or fluid such as, for example oil, through a removable filling cap 78 having therein a vent hole 79 which cap is screw threaded into the casing 7.

Formed in the casing 54 is a short passageway 80 that is coaxial with the bore 72 and the counterbore 71. One end of this passageway 80 opens into the bottomed bore 68 at the left-hand end thereof and the other end opens into a passageway 81 and has an annular valve seat 82 formed thereat. A ball-type valve 83 is normally biased against the valve seat 82 by a spring 84 to close communication between the interior of the bottomed bore 68 and the passageway 81 which extends through the casing 54 of the slack adjuster mechanism 53 and the leg member 56 of casing 7 and opens into a chamber 85 formed in this leg member 56. As can be seen from FIG. 1, this chamber 85 is connected to the interior of the bottomed bore 29 by a short passageway 86.

As can be seen from FIG. 3, the casing 54 of the slack adjuster mechanism 53 is provided with a boss 87 integral therewith and having therein a bottomed bore 88. Slidably mounted in the bottomed bore 88 is a piston 89 between which piston and the upper end of the bottomed bore 88, as viewed in FIG. 3, is interposed a spring 90 for normally biasing the piston 89 against a snap ring 91 that is inserted in a groove formed in the wall surface of the bottomed bore 88 adjacent its lower end.

The piston 89 is provided with a peripheral annular groove in which is disposed an O-ring 92 that forms a seal with the wall surface of the bottomed bore 88. Thus, when the lower side of piston 89 is subject to hydraulic pressure, this piston is effective to compress the spring 90 and move upward in the bottomed bore 88 and thereby provide an accumulator or volume below the piston 89 to receive hydraulic fluid displaced from the counterbore 67 (FIG. 1) when the hydraulic piston 66 is moved in the direction of the left hand in a manner hereinafter explained.

Assume that the reservoir 76, passageway 77, bore 72, counterbore 71, bottomed bore 68, counterbore 67, passageways 80 and 81, chamber 85, passageway 86, bottomed bores 28 and 29, passageways 43, 45, 46, 47 and 48, and chambers 44 are all filled with some suitable hydraulic fluid such as oil.

When it is desired to effect a brake application, fluid under pressure, that is pneumatic pressure, is supplied to the pressure chambers 32 and 33 through the pipe 39, pipe tee 38, pipes 36 and 37, and ports 34 and 35 from the usual air brake system on railway freight cars. Fluid under pressure thus supplied to the chambers 32 and 33 (FIG. 1), formed between the respective packing cups 31 and the pressure head 25, is effective to simultaneously displace these packing cups 31 and the respective pistons 21 and 22 to which they are secured together with the hydraulic pistons 26 and 27 in the direction of the left hand with respect to the casing 7 against the yielding resistance of the springs 40 and 41.

As the piston 27 moves in the direction of the left hand it is effective to exert a pressure on the hydraulic fluid in the bottom bore 29, short passageway 86, chamber 85 and passageway 81 to force the ball valve 83 against its seat 82 to trap the hydraulic fluid on the outlet side of the valve 83 and prevent the escape of this fluid back into the bottomed bores 68 and 88 where it would be effective to move the accumulator piston 89 upward as viewed in FIG. 3, against the yielding resistance of spring 90.

As the pneumatic pistons 21 and 22 and corresponding hydraulic pistons 26 and 27 continue to be simultaneously displaced in the direction of the left hand in response to the supply of pneumatic pressure to the chambers 32 and 33, the hydraulic fluid trapped in the bottomed bores 28 and 29 will be forced therefrom through the passageways 43, 46, 45, 47 and 48 to the four chambers 44 at the outer end of the corresponding four pistons 18. Since a hydraulic fluid is incompressible, a build-up of pressure will occur on the outer face of these brake applying hydraulic pistons 18. When this force has increased to a value sufficient to overcome the force of the four brake release springs 14, the two pistons 18 on each side of the brake disc 2 will be displaced in the direction of this disc 2 (FIG. 2) as the pistons 21 and 26, and the pistons 22 and 27 are displaced in the direction of the left hand, as viewed in FIG. 1.

As the two pistons 18 (not shown) above the disc 2, as viewed in FIG. 2, are displaced in a downward direction, they are effective to move the backing plate 5 and brake shoe 3 carried thereon downward against the yielding resistance of the two springs 14 on the upper side of the disc, one of which appears in FIG. 2. This downward movement of backing plate 5 is effective to move the brake shoe 3 into braking contact with the upper braking face of the now rotating disc 2 and apply a braking force to the upper face of this disc for effecting a brake application on the wheel and axle assembly that carries this disc 2. Simultaneously, the two pistons 18 below the disc 2, as viewed in FIG. 2, one of which pistons appears in this figure, are displaced in an upward direction to move the backing plate 6 and brake shoe 4 carried thereon upward against the yielding resistance of the two springs 14 (not shown) on the lower side of this disc. This upward movement of the backing plate 6 is effective to move the brake shoe 4 into braking contact with the lower braking face of the rotating disc 2 and apply a braking force thereto. Thus, substantial equal braking forces are simultaneously applied to the opposite braking faces of the rotating disc 2.

So long as the wear of the brake shoes 3 and 4 and the brake disc 2 is less than a chosen amount, the piston 22 (FIG. 1) will not be moved in the direction of the left hand far enough for the packing cup 30 to uncover the upper end of the passageway 63. Consequently, no pneumatic pressure is supplied to the chamber 58 to cause operation of the slack adjuster mechanism 53 at this time.

Upon subsequent simultaneous release of pneumatic pressure from the chambers 32 and 33 for effecting a brake release, springs 40 and 41 will respectively simultaneously move pistons 26 and 21 and pistons 27 and 22 in the direction of the right hand, as viewed in FIG. 1, toward their release position in which they are shown. As these pistons move toward their release position, hydraulic pressure is removed from the outer ends of the four pistons 18 whereupon the four springs 14 are rendered effective via the corresponding release pistons 12 and piston rods 15 to move the backing plates 5 and 6 and the corresponding brake shoes 3 and 4 away from the brake disc 2 until these pistons 12 each abut the corresponding snap ring 13.

Since the passageways extending between the four pistons 18 and the hydraulic pistons 26 and 27 are completely filled with a hydraulic medium, as the backing plates 4 and 5, are moved away from the brake disc 2 by the springs 14, these backing plates are effective to move the two pistons 18 abutting each backing plate simultaneously therewith. This movement of the pistons 18 causes flow of the hydraulic fluid through the passageways extending from these pistons 18 to the two hydraulic pistons 26 and 27.

Assume that a brake application has been effected in the manner described above to move the brake shoes 3 and 4 into braking contact with the opposite braking faces of the disc 2. Let it be further assumed that, while this brake application is in effect, either the braking surface of the brake shoes 3 and 4 wears away or the braking surfaces of the brake disc 2 wear away.

In order to maintain the brake shoes 3 and 4 against the braking faces of the rotating disc 2 as the shoes 3 and 4 and/or the disc 2 wear away, the two pistons 18 on each side of the disc 2 will be moved in the direction of this disc to compensate for such wear as the pistons 26 and 21 and the pistons 27 and 22 are simultaneously moved in the direction of the left hand, as viewed in FIG. 1, by the pneumatic pressure present in the chambers 32 and 33.

Therefore, when the brake shoes 3 and 4 and/or the brake disc 2 wear away sufficiently for the packing cup 30 (FIG. 1) carried by the piston 22 to be moved in the direction of the left hand past the end of the passageway 63 opening at the wall surface of the bottomed bore 24, pneumatic pressure will be supplied to the chamber 58 at the right-hand side of the diaphragm 57.

As hereinbefore explained, when the hydraulic piston 27 moves in the direction of the left hand, it is effective to force the ball valve 83 against its seat 82. Moreover, it will be noted from FIG. 1 that any movement of the hydraulic piston 66 in the direction of the left hand would be effective to force the valve 74 against its seat 73. Consequently, the pneumatic pressure supplied to the chamber 58 in the manner described above is effective on the right-hand side of the diaphragm 57 to deflect this diaphragm in the direction of the left hand and thereby move the diaphragm follower 65 and hydraulic piston 66 in the direction of the left hand against the yielding resistance of the spring 70 to cause a force to be transmitted through the incompressable hydraulic fluid present in counterbore 67, and bottomed bores 68 and 88 to the lower face of the accumulator piston 89 (FIG. 3) which force is effective to move this piston 89 in an upward direction against the yielding resistance of the spring 90 until the diaphragm follower 65 (FIG. 1) is moved into abutting relation with the casing 54. Thus, the accumulator piston 89 compresses spring 90 to increase the volume of that portion of the bottomed bore 88 below this piston to receive the hydraulic fluid forced from the bottomed bore 68 and coaxial counterbore 67 as the hydraulic piston 66 and diaphragm follower 65 are moved from the position shown in FIG. 1 in the direction of the left hand to the position in which follower 65 abuts the casing 54.

Let it now be supposed that a brake release is effected in the manner hereinbefore described. Consequently, as pneumatic pressure is reduced in the chambers 32 and 33, the springs 40 and 41 are rendered effective to respectively move the pistons 26 and 21 and the pistons 27 and 22 in the direction of the right hand, as viewed in FIG. 1, toward the position shown.

When the packing cup 30 carried by the piston 22 is moved in the direction of the right hand past the end of the passageway 63 that opens at the wall surface of the bottomed bore 24, fluid (air) under pressure will be vented from the chamber 58 at the right-hand side of diaphragm 57 to atmosphere via passageway 61, chamber 62, passageway 63, choke 64, non-pressure chamber 50 and passageway 51 at a rate determined by the size of the choke 64.

The volume of the chamber 62 and the size of the choke 64 are so selected that the fluid pressure in the chamber 58 and acting on the right-hand side of the diaphragm 57 is reduced at a slower rate than the fluid pressure in the chambers 32 and 33 since there is no choke to restrict flow from these chambers. Consequently, as the springs 40 and 41 respectively move the pistons 26 and 21 and the pistons 27 and 22 toward their release position in which they are shown in FIG. 1, the pressure of the hydraulic fluid in the bottomed bores 28 and 29 and in the passageways connected thereto will be reduced to a value that is less than the pressure of the hydraulic fluid present in the bottomed bore 68 and coaxial counterbore 67 and acting on the lower face of the accumulator piston 89 shown in FIG. 3 of the drawings.

Therefore, when the pistons 26, 21, 27 and 22 reach the position in which the pressure of the hydraulic fluid present in the bottomed bores 28 and 29, the four chambers 44, and the several passageways connecting these chambers and bottomed bores is less than the pressure of the hydraulic fluid present in the counterbore 67 and coaxial bottomed bore 68 and acting on the accumulator piston 89 and ball check valve 83, this valve 83 will be unseated from its seat 82 whereupon the spring 90 (FIG. 3) is rendered effective to expand and move the piston 89 downward, as viewed in FIG. 3, to force the hydraulic medium or liquid from the bottomed bores 88 and 68 past the check valve 83 (FIG. 1), and through passageway 81, chamber 85, and passageway 86 into the bottomed bore 29 until the piston 89 is moved into abutting relationship with the snap ring 91.

Since the bottomed bore 29 is connected to each of the four chambers 44 via the passageways 47, 48, 45, 43 and 46, the volume of hydraulic fluid supplied to the interior of the bottomed bore 29 in the manner just explained is effective to move each of the four pistons 18 the same amount in the direction of the disc 2. It is apparent, therefore, that the two pistons 18 on each side of the brake disc 2 move the backing plate and brake shoe that is disposed on the corresponding side of the disc 2 toward the adjacent braking face of this disc a chosen amount to compensate for wear of the shoes and disc that occurred during the previous brake application.

When the piston 22 and packing cup 30 carried thereby are moved in the direction of the right hand during a brake release to the position in which the packing cup 30 uncovers the end of the passageway 63 that opens at the wall surface of the bottomed bore 24, the chamber 58 is connected to atmosphere via passageway 61, chamber 62, passageway 63, choke 64, non-pressure chamber 50 and passageway 51. Consequently, the pressure in the chamber 58 is reduced to atmosphere pressure at a rate determined by the size of the choke 64.

When the pressure in the chamber 58 is thus reduced to atmospheric pressure in the manner just explained, hydraulic piston 66 is moved by the spring 70 in the direction of the right hand to the position in which it is shown in FIG. 1 thereby reducing the pressure on the hydraulic fluid present in the counterbore 67 and bottomed bore 68, and on the lower side of the accumulator piston 89 (FIG. 3) to atmospheric pressure. As the hydraulic piston 66 is thus moved in the direction of the right hand, it is effective to increase the volume of the bottomed bore 68 whereupon the ball check valve 74 is unseated from its seat 73 so that hydraulic fluid present in the reservoir 76 will then flow therefrom to the interior of the bottomed bore 68 and counterbore 67 via passageway 77, bore 72, past unseated check valve 74, counterbore 71 and bottomed bore 68. Consequently, when the piston 66 reaches the position shown in FIG. 1, the bottomed bore 68 and coaxial counterbore 67 are completely filled with hydraulic fluid. It should be noted that the vent hole 79 in the filling cap 78 insures that the top surface of the hydraulic medium in the reservoir 76 is subject to atmospheric pressure so as to assure that the above-described flow of the hydraulic medium from the reservoir 76 to the bottomed bore 68 and coaxial counterbore 67 will occur as the piston 66 is moved in the direction of the right hand by the spring 70.

It may be noted that the above-mentioned chosen amount of movement of the backing plates and brake shoes carried thereby toward the braking disc 2 may not be great enough to insure that the clearance between the brake shoes and the disc 2 is the same as prior to the wearing away of the shoes and disc. If this be the case, then, upon effecting a brake release subsequent to the next brake application, the hydraulic-type slack adjuster mechanism 53 operates in the manner hereinbefore described to supply the same quantity of hydraulic fluid to the bottomed bore 29 and the passageways connected thereto as was supplied to this bottomed bore upon effecting the first brake release subsequent to the wearing away of the brake shoes and/or brake disc 2. Thus, a definite quantity of hydraulic fluid is supplied to the bottomed bore 29 and the passageways connected thereto upon effecting each brake release subsequent to brake shoe and/or brake disc wear until the total quantity of hydraulic fluid therein is such that, upon effecting a brake application, the brake shoes 3 and 4 will be moved into contact with the opposite braking faces of the rotating disc 2 before the piston 22 is moved in the direction of the left hand, as viewed in FIG. 1, far enough for the packing cup 30 carried by this piston 22 to uncover or move past that end of the passageway 63 that opens at the wall surface of the bottomed bore 24.

Having now described the invention, what I claim as new and desire to secure by Letters Patent is:

1. In a hydro-pneumatic disc brake mechanism for applying a braking force to a rotatable member carried on a wheel and axle assembly, the combination comprising:
   a. a brake disc carried on the wheel and axle assembly,
   b. brake shoes movably mounted on the respective opposite sides of said brake disc,
   c. a casing having therein two parallel spaced apart bottomed bores extending inward from one end thereof, and being provided with two parallel spaced apart U-shaped arm members, each having one end integral with one side of said casing, the other end being disposed on one side of said brake disc and provided with a plurality of spaced apart parallel bores into one end of certain of which bores open one end of one of a plurality of spaced apart passageways provided in said arm member the other end of each of said plurality of passageways in said arm member opening into one of said bottomed bores in said casing,
   d. a pressure head secured to said one end of said casing and having therein two parallel spaced apart bottomed bores coaxial with said two bottomed bores in said casing and of relatively larger diameter,
   e. a pair of pistons operative respectively in said bottomed bores in said pressure head and movable in opposite directions responsively to application and release of pneumatic pressure to one side thereof,
   f. a pair of plungers each operatively connected to one of said pair of pistons and operable in one of said bottomed bores in said casing,
   g. a reservoir filled with a hydraulic medium,
   h. means for supplying said hydraulic medium from said reservoir to said bottomed bores in said casing, said hydraulic medium in said bottomed bores being subject to pressure upon movement of said pair of plungers in one direction,
   i. two pair of brake applying pistons, each pair being disposed in a pair of said certain spaced apart parallel bores in one of said arm members and movable responsively to hydraulic pressure established in said bottomed bores as communicated to said certain spaced apart parallel bores via said passageways and acting on said brake applying pistons for effecting movement of a corresponding one of said brake shoes into braking contact with one side of said brake disc and exerting a brake applying force thereon,
   j. two pair of brake releasing pistons, each pair being slidably disposed in another pair of said spaced apart parallel bores in one of said arm members and operably connected to one of said brake shoes, and
   k. two pair of release springs, each pair interposed between one pair of said brake releasing pistons and the corresponding arm member and effective to move a corresponding brake shoe to a release position out of contact with said brake disc in the absence of hydraulic pressure acting on the pair of brake applying pistons for said brake shoe.

2. In a hydro-pneumatic disc brake mechanism for applying a braking force to a rotatable member carried on a wheel and axle assembly, the combination comprising:
   a. a rotatable brake disc carried on the wheel and axle assembly,
   b. a brake shoe movably mounted on one side of said brake disc,
   c. a casing having therein two parallel spaced apart bottomed bores extending inward from one end thereof, and being provided with a U-shaped arm member having one end integral with one side of said casing, the other end being disposed on said one side of said brake disc and provided with a plurality of spaced apart parallel bores into one end of each of one pair of which opens one end of one of a plurality of spaced apart passageways provided in said arm member the other end of each of said plurality of passageways in said arm member opening into one of said bottomed bores in said casing,
   d. a pressure head secured to said one end of said casing and having therein two parallel spaced apart bottomed bores coaxial with said two bottomed bores in said casing and of relatively larger diameter,
   e. a pair of pistons operative respectively in said bottomed bores in said pressure head and movable in opposite directions responsively to application and release of pneumatic pressure to one side thereof,
   f. a pair of plungers each operatively connected to one of said pair of pistons and operable in one of said bottomed bores in said casing,
   g. a reservoir filled with a hydraulic medium,
   h. means for supplying said hydraulic medium from said reservoir to said bottomed bores in said casing, said hydraulic medium in said bottomed bores being subject to pressure upon movement of said pair of plungers in one direction,
   i. a pair of brake applying pistons disposed respectively in a pair of said certain spaced apart parallel bores in said arm member and movable responsively to hydraulic pressure established in said bottomed bores as communicated to said pair of said certain spaced apart parallel bores via said pair of passageways and acting on said pair of brake applying pistons for effecting movement of said brake shoe into braking contact with said brake disc and exerting a brake applying force thereon,
   j. a pair of brake releasing pistons, each being slidably disposed in another one of said plurality of spaced apart parallel bores in said arm member and operably connected to said brake shoe, and
   k. a pair of release springs, each interposed between one of said pair of brake releasing pistons and said arm member and effective to move said brake shoe to a release position out of contact with said brake disc in the absence of hydraulic pressure acting on said pair of brake applying pistons.

3. In a hydro-pneumatic disc brake mechanism, as recited in claim 2, further characterized in that said means for supplying said hydraulic medium from said hydraulic reservoir to said bottomed bores in said casing comprises:
   a. valve means controlling flow of hydraulic medium from said reservoir to said bottomed bores, and
   b. hydro-pneumatic means for controlling operation of said valve means.

4. In a hydro-pneumatic disc brake mechanisms, as recited in claim 2, further characterized in that said means for supplying said hydraulic medium from said hydraulic reservoir to said bottomed bores in said casing comprises:
   a. a body member secured to said casing and having therein a plurality of intersecting bores,
   b. a first one-way valve means controlling flow of hydraulic medium from said reservoir to said plurality of intersecting bores,
   c. a second one-way valve means controlling flow of hydraulic medium from said plurality of intersecting bores to said bottomed bores in said casing,
   d. a spring-biased abutment operably disposed in one of said plurality of intersecting bores for increasing the volume of said one bore in response to the application of pressure to said abutment,
   e. abutment means operably disposed in another of said plurality of intersecting bores and movable in one direction to simultaneously render said first one-way valve means inoperative to control flow of hydraulic medium from said reservoir to said plurality of intersecting bores and to subject said spring-biased abutment to pressure to cause an increase in the volume of said one bore accordingly as said abutment means decreases the volume of said another bore, and subsequently movable in an opposite direction to successively render said spring-biased abutment operable to simultaneously decrease the volume of said one bore and effect flow therefrom past said second one-way valve means to said bottomed bores in said casing, and said first one-way valve means operable to cause flow of said hydraulic medium from said reservoir to said plurality of intersecting bores, and f. means responsive to excessive movement of one of said pair of pistons subject to pneumatic pressure in response to wear of said brake shoe for subjecting said abutment means to pneumatic pressure to cause movement thereof in said one direction.

5. In a hydro-pneumatic disc brake mechanism, as recited in claim 4, further characterized by means effective to cause movement of said abutment means in said opposite direction.

6. In a hydro-pneumatic disc brake mechanism, as recited in claim 4, further characterized in that said second one-way valve means is rendered inoperative to control flow of hydraulic medium from said plurality of bores to said bottomed bores in said casing so long as the pressure established in said bottomed bores by the respective plungers therein exceeds the pressure established on said spring-biased abutment by said abutment means.

7. In a hydro-pneumatic disc brake mechanism, as recited in claim 4, further characterized in that said abutment means comprises:

a. a piston slidably and sealably mounted in said another bore, and b. a diaphragm in coaxial alignment with said piston and having one side thereof disposed in abutting relation to an adjacent side of said piston and constantly subject to atmospheric pressure.

8. In a hydro-pneumatic disc brake mechanism, as recited in claim 4, further characterized by means normally biasing said first and said second one-way valve means to a closed position.

9. In a hydro-pneumatic disc brake mechanism, as recited in claim 4, further characterized in that the axis of said spring biased abutment, and the axes of said first and said second one-way valve means lie in a common plane, and the axis of said another bore forms a right angle with said plane.

10. In a hydro-pneumatic disc brake mechanism, as recited in claim 4, further characterized by means for controlling the rate at which pneumatic pressure is supplied to and released from said abutment means.

11. In a hydro-pneumatic disc brake mechanism, as recited in claim 4, further characterized in that said spring-biased abutment, upon each successive operation to decrease the volume of said one bore, effects flow of the same quantity of hydraulic medium past said second one-way flow valve means to said bottomed bores in said casing.

12. In a hydro-pneumatic disc brake mechanism for applying a braking force to a rotatable member carried on a wheel and axle assembly, the combination comprising:

a. a rotatable brake disc carried on the wheel and axle assembly, b. a brake shoe movably mounted on one side of said brake disc, c. a casing having therein a bottomed bore extending inward from one end thereof, said casing being provided with an arm member that has one end integral therewith, the other end being disposed on said one side of said brake disc and provided with a plurality of spaced apart parallel bores into one end of one of which opens one end of a passageway extending through said arm member and opening at its other end into said bottomed bore in said casing, d. a pressure head secured to said one end of said casing and having therein a bottomed bore coaxial with said bottomed bore in said casing and of relatively larger diameter, e. a piston sealably and slidably disposed in said bottomed bore in said pressure head and movable in opposite directions responsively to application and release of pneumatic pressure to one side thereof, f. a plunger operatively connected to said piston and operable in said bottomed bore in said casing, g. a reservoir filled with a hydraulic medium, and h. means for supplying said hydraulic medium from said reservoir to said bottomed bore in said casing, said hydraulic medium in said bottomed bore being subject to pressure upon movement of said plunger in one direction, and said means comprising:

1. a body member secured to said casing and having therein a plurality of intersecting bores, 2. a first one-way valve means controlling flow of said hydraulic medium from said reservoir to said plurality of intersecting bores, 3. a second one-way valve means controlling flow of said hydraulic medium from said plurality of intersecting bores to said bottomed bore in said casing, 4. a spring-biased abutment operably disposed in one of said plurality of intersecting bores for increasing the volume of said one bore in response to the application of pressure to said abutment, 5. abutment means operably disposed in another of said plurality of said intersecting bores and movable in one direction to simultaneously render said first one-way valve means inoperative to control flow of said hydraulic medium from said reservoir to said plurality of intersecting bores and to subject said spring-biased abutment to pressure to cause an increase in the volume of said one bore accordingly as said abutment means decreases the volume of said another bore, and subsequently movable in an opposite direction to successively render said spring-biased abutment operable to simultaneously decrease the volume of said one bore and effect flow therefrom past said second one-way valve means to said bottomed bore in said casing, and said first one-way valve means operable to cause flow of said hydraulic medium from said reservoir to said plurality of intersecting bores, and 6. means responsive to excessive movement of said piston subject to pneumatic pressure in response to wear of said brake shoe for subjecting said abutment means to pneumatic pressure to cause movement thereof in said one direction, i. a brake applying piston disposed in said one of said plurality of spaced apart parallel bores in said arm member, said brake applying piston being movable responsively to hydraulic pressure established in said bottomed bore in said casing as communicated to said one bore via said passageway in said arm member and acting on said brake applying piston for effecting movement of said brake shoe into contact with said brake disc and exerting a brake applying force thereon, j. a brake releasing piston slidably disposed in another of said plurality of spaced apart parallel bores in said arm member and operably connected to said brake shoe, and k. a release spring interposed between said break releasing piston and said arm member and effective to move said brake shoe to a release position out of contact with said brake disc in the absence of hydraulic pressure acting on said brake applying piston.

* * * * *